Aug. 11, 1959  E. R. CORNEIL  2,898,859
FLEXIBLE TUBE FLUID MEASURING AND CONTROLLING DEVICE
Filed July 15, 1957
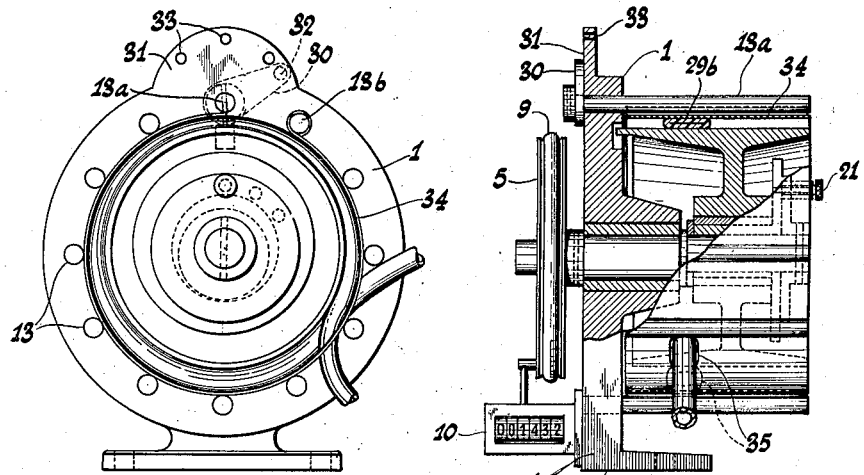
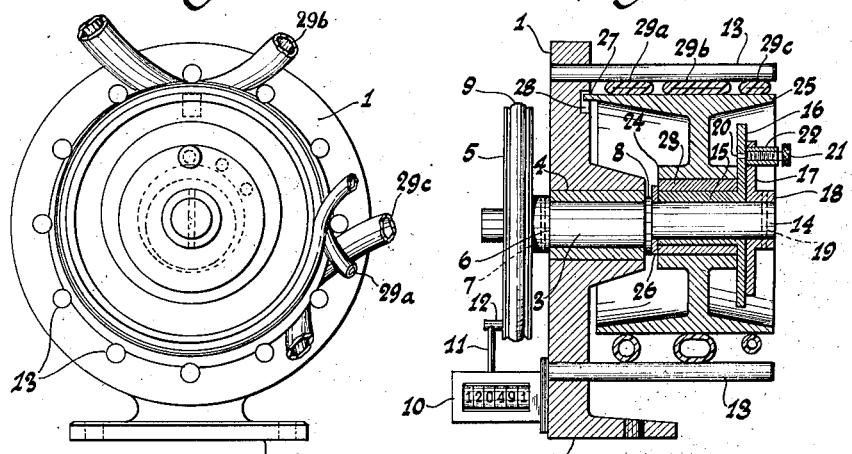
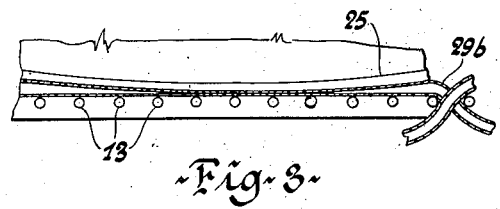
INVENTOR
Ernest R. Corneil
BY Alex. E. MacRae
ATTORNEY

United States Patent Office 2,898,859
Patented Aug. 11, 1959

2,898,859

FLEXIBLE TUBE FLUID MEASURING AND CONTROLLING DEVICE

Ernest R. Corneil, Thorold, Ontario, Canada

Application July 15, 1957, Serial No. 671,807

4 Claims. (Cl. 103—37)

This invention relates to flexible tube fluid measuring and controlling devices.

The positive control of the rate of flow of fluids is a requirement of most chemical processes. It is of special importance in the biological research laboratory as well as those in the fields of the other sciences. Many devices, mostly involving fixed orifices, have been developed and are used. One of the simplest forms uses a flexible tube to which a pinch clamp is applied and adjusted to compress the tube to form an elongated fixed orifice of the required size to allow the desired volume of fluid to pass under the given pressure conditions. However, the rate of flow is subject to variations in pressure across the orifice and in addition, to viscosity characteristics. These greatly affect the rate of flow. When temperatures are accurately controlled or compensated for, Newtonian liquids—systems with viscosity independent of time and rate of shear—can be quite accurately metered with simple fixed orifices. These represent a very small portion of the fluid systems in current processes and positive measuring means are sought for non-Newtonian fluids, plastic dispersions, shear hardening dispersions, sols, gels, rehopectic dispersions, etc. Animal and plant fluids often fall into one or more of these groups and research has been limited by the availability of continuous positive measuring devices which are readily sterilized and non-injurious to the passing fluids which may contain living cells and organisms. It is often desirable to change the rate of flow without interrupting the cycle of the machine or the size of the flexible measuring tube. Heretofore, no means has been available to make this possible. For example in metering whole blood in heart operations it is desirable to maintain a frequency compatible with the patient's pulse but at the same time to have full control of the quantity of blood being circulated from zero to the maximum capacity without, in any way, interrupting the cycle. This has not previously been accomplished. It has only been approached by changing the frequency by using variable speed devices. These are expensive and complicate greatly the mechanisms incidental to the control of the flow.

An object of the invention is to provide apparatus for the continuous measurement of thixotropic fluids and the like flowing within flexible tubes. Another object is to extend the simplicity of the pinch clamp type of control to positive measuring apparatus. Still another object is to provide means for continuously metering together two or more fluids at rates consistent with the diameter of the tubing.

Another object is the provision of apparatus in which an easily interchangeable flexible tube is the flow controlling member in contact with the fluid.

Other objects include the provision of means whereby adjustment for tube wall thickness and orifice size may be effected, means having a positive urging action through a metering member independently of thixotropic characteristics of the fluid, and means for maintaining a given frequency of the positive urging action through a metering member while permitting uninterrupted control of the rate of flow.

The invention will be described with reference to the accompanying drawing, in which—

Figure 1 is an end elevation of an apparatus in accordance with the invention,

Figure 2 is a side elevation, partly in section,

Figure 3 is a projected cross-section through the center of a loop of tubing,

Figure 4 is an end elevation of a somewhat modified form of apparatus, and

Figure 5 is a side elevation, partly in section, of the apparatus shown in Figure 4.

Referring to Figures 1, 2 and 3, 1 is an upright frame member provided with a supporting base 2. A shaft 3, horizontally disposed as shown, is journalled in the frame in bearing 4. Means for driving shaft 3 comprises a pulley 5 having its hub 6 fixed to the outer end of the shaft as by a pin 7. Conveniently, the inner end of the shaft may be provided with a shoulder 8 engaging the adjacent end of bearing 4, the hub 6 engaging the other end of bearing 4 to longitudinally position the shaft in the bearing. A belt 9 connects the pulley to a driving source, not shown, operable to drive the pulley and shaft at any desirable predetermined or variable speed. A revolution counter 10 is preferably provided and, as shown, is mounted on frame 1. It has an operating lever 11 for actuation by a pin 12 carried by pulley 5 by engagement therewith on each successive revolution of the pulley.

A series of equally spaced posts 13 are fixed in frame 1 in a circular path having a center common to shaft 3, the posts being parallel to the shaft in the modification shown.

Shaft 3 has an extension 14 extending from shoulder 8 and having its axis offset from that of shaft 3. Mounted on shaft extension 14 is a cam or eccentric 15. Means for adjusting the position of cam 15 relatively to shaft extension 14 comprises a radial flange 16 on the cam, and an adjoining radial flange 17 carried by a hub 18 fixed to the extension 14 by a pin 19. Flange 16 has a series of holes 20 arranged about a common radius to selectively receive the point of a positioning screw 21 supported in knob 22 mounted in flange 17. It will be apparent that cam 15 may be rotated about shaft extension 14 to selected position and then locked thereto by engagement of screw 21 with a hole 20.

Cam 15 revolves in a bearing 23 fixed within hub 24 of a cylinder 25. A washer 26 on extension 14 interposed between shoulder 8 and the end of cam 15 maintains cylinder 25 in position on the shaft extension 14. In such position, a prong 27 on the edge of the cylinder 25 extends into a slot or groove 28 in frame 1.

Three flexible tubes 29a, 29b, and 29c are shown for the conduction of fluids, each tube having a complete loop thereof disposed between the external surface of cylinder 25 and the posts 13. Referring to Figure 1, it will be observed that each loop extends around the cylinder so that the ends thereof pass around a common post 13 and through adjacent spaces between the posts. The loop ends can, therefore, be positioned around any post 13 convenient to connected apparatus.

It will be apparent that, with flanges 16 and 17 locked to each other in selected relation, driving movement of shaft 3 will cause revolution of its eccentric extension 14 and cam 15 and in turn cause cylinder 25 to swing around a center which is the resultant of the eccentricity of extension 14 and cam 15, prong 27 oscillating in groove 28 to permit such movement. It will also be apparent that this swinging movement of the cylinder 25 will progressively deform the tubes 29a, 29b and 29c between the external surface thereof and the posts 13. Since the thickness of the tubes will have a bearing upon the extent of deformation, the means of adjustment of the relation of cam 15 to extension 14 has been provided. A hole 20 for engagement by screw 21 will thus be selected which will provide satisfactory operation for a particular tube thickness. For convenience, the tube thicknesses corresponding to the holes 20 may be indicated on the frame 1 (as shown, 1/16, 5/64, 3/32).

The deforming action imposed on the tubes will be more clearly understood by reference to Figure 3, wherein a loop of tube 29b has been projected into a plane and related to adjacent parts. As shown, the circumference of cylinder 25 is projected into position relative to posts 13 which are indicated in a straight line. It will thus be seen that, at any position of cylinder 25, a line in its surface has moved into its closest relative position to a post 13. In so doing, the tube has been deformed so that its interior surfaces approach each other to form an orifice. However, as cylinder 25 oscillates around cam 15, this orifice is moved from post to post and solids momentarily lodged in an instantaneous orifice are released as the oscillation progresses. In advancing, the orifice gently urges fluids and solids before it. Since there is no centrifugal force applied to segregate the heavier components, the fluids, such as slurries and the like, remain in their normal state of distribution.

Referring to Figures 4 and 5, the modification illustrated is generally the same as that shown in Figures 1 and 2 but has incorporated therein means for adjusting the rate of flow of the fluid material under treatment. As shown, one of the posts 13, designated as 13a is journalled rather than fixed in the frame. Its rotation is controlled by a lever 30 fixed thereto adjacent the external surface of frame 1. The lever 30 sweeps in an arc on a projection 31 on frame 1, and carries a screw 32 which is adapted to be screwed into one of a series of holes 33 in projection 31 thereby to lock post 13a in selected position against rotation. A thin flexible band 34 has one end anchored in post 13a and extends around cylinder 25 inside the row of posts 13 but outside the tube, such as 29b, located in the device. The other end of band 34 is anchored to the post 13 adjacent post 13a and designated as 13b. The ends of tube 29b pass through slots 35 in the band 34.

With post 13a locked in selected position, operation of the device takes place as previously described. When a change in the rate of flow is required, screw 32 is backed out of the hole 33 in which it has been positioned and the lever 30 actuated to rotate post 13a to a position determined by another hole 33 where it is again locked in position. Rotation of post 13a moves band 34 to shorten or lengthen it as the case may be. Assuming that its length has been shortened, it will be apparent that such shortening action will reduce the external circumference of the loop of tube 29b. In so doing, the recovery of the tube is limited to something less than its relaxed position. Since the volume of the loop times the frequency equals the rate of flow and since the restriction applied by the band 34 limits the volume, a new rate of flow is established. As the adjustment of the band 34 in no way affects the cycle or revolutions per minute of the driven shaft, it will be apparent that the rate of flow can be adjusted without interrupting the frequency. In other words, this mechanism provides means for controlling rate of flow independently of variable speed and gear reduction devices. Furthermore, control of flow rate does not interrupt the frequency of the urging action.

Since the characteristics of corn syrup and ketchup are non-technically familiar and are typical of the broad field of materials in which present orifices and other continuous flow measuring devices have unreliable accuracy, these were used to illustrate the usefulness of the invention.

Using a resilient tube having a 1/2 inch internal diameter and a 1/8 wall thickness in a machine accepting a loop having a median diameter of 6 inches and setting the orifice at completely closed, it was found that 28.1 cc. of water were delivered at 5 revolutions per minute. Under the same conditions 27.63 cc. of 21° C. corn syrup were delivered per revolution. When the temperature was raised to 31° C., 27.78 cc. were delivered and at 41° C., 27.83 cc. were delivered. It will be noted that the variation was less than 1%.

Again, the same equipment was applied to freshly mixed ketchup, containing solids, i.e., the seeds and pulp. The average delivery per revolution during a five minute period was 26.89 cc. After an interval of time of continued operation a second sample was drawn. It was found that an average of 26.94 cc. were delivered per revolution during the second five minute period.

Figures 1 and 2 show tubes 29a, 29b and 29c, all having the same wall thickness and different internal diameters. Since the maximum distance between the surface of cylinder 25 and pin 13 is less than the sum of the internal diameter of 29a plus twice the wall thickness, it will be seen that this tube cannot reach the capacity commensurate with its diameter. However, it does have a constant displacement per revolution at a major fraction of its full capacity. In the case of 29b, the internal diameter plus twice its wall thickness equals the distance between pin 13 and cylinder 25. Therefore, tube 29b will have a capacity per revolution of one half the area times the length measured on the median circumference. Then in the case of 29c, the internal diameter plus twice the wall thickness is less than the distance between pin 13 and cylinder 25. Under this condition the capacity is more than one half the internal area times the length measured on the median circumference. It will be seen therefore, that by selection of tube diameters a wide variation in capacity per revolution can be attained and that these capacities will be related one to the other but not necessarily proportional to the internal cross-sectional areas.

Although the drawings show the minimum orifices of the wall completely contacting each other, this is not essential to operation. The walls need not be brought into intimate contact just as setting a common pinch clamp. In this case, the orifice acts as the metering unit but since it moves from post to post, it continuously relieves the tendency to plug up as in static orifices.

It will be understood that various changes may be made in the apparatus shown and described within the scope of the invention. For instance, while the drawings show a series of clamps in a position parallel to the axis of the driving shaft, it will be recognized that the tube contacting parts may be at right angles to the shaft. Further, although the series of posts are shown as fixed to form the anvils of the clamps and the cylinder oscillates to act as the presser member, it will be obvious that the action could be reversed by oscillating the frame carrying the posts in conjunction with a fixed cylinder serving as the anvils. The shape and disposition of the various parts may vary as desired to accomplish the desired purpose.

I claim:

1. A fluid measuring device comprising a frame, a series of equidistantly spaced posts stationarily fixed to said frame in a circular path, a cylinder carried by said frame and having an external surface in radial inwardly spaced relation to said posts, a flexible tube, the space between said posts and external surface being arranged to receive at least one loop of said flexible tube for conduction of fluid therethrough, and means for imparting oscillatory movement to said cylinder to progressively vary the radial distance between each said post and said external surface and thereby to progressively deform said tube loop said last mentioned means comprising a driven shaft mounted in said frame and having an eccentric extension, said cylinder being mounted on said eccentric extension.

2. A fluid measuring device comprising a frame, a flexible tube, a series of equidistantly spaced posts stationarily fixed to said frame in a circular path, a driven shaft journalled in said frame in coaxial relation to said circular path, said shaft having an eccentric extension on one end thereof, a cam fixed to said eccentric extension for revolution therewith, and a cylinder journalled on said cam and having means limiting rotative movement thereof, said cylinder having oscillatory movement in response to revolution of said eccentric extension and said cam, said cylinder having an external surface in radial inwardly spaced relation to said posts, the space between said posts and external surface being arranged to receive at least one loop of said flexible tube for conduction of fluid therethrough, said oscillatory movement of said cylinder being operable to progressively vary the radial distance between each said post and said external surface and thereby to progressively deform said tube loop.

3. A fluid measuring device as defined in claim 2, including means for varying the relative positions of said eccentric extension and said cam comprising a radial flange on said cam, a radial flange fixed to said eccentric extension, said cam being rotatively mounted on said extension, and means for locking said flanges together in a selected one of a plurality of positions.

4. A fluid measuring device as defined in claim 2, including means for varying the rate of flow through said tube comprising a flexible band interposed in the space between said posts and said external surface of the cylinder and extending around said external surface of the cylinder, said tube loop being positioned between said band and said external surface, one end of said band being secured to one of said posts, and the other end of said band being secured to the adjacent one of said posts, said first one of said posts being journalled in said frame and having a lever for imparting rotative movement thereto, and means for locking said lever in a selected one of a plurality of positions to fix said one post to said frame, the length of said band being thereby adjustable.

References Cited in the file of this patent

UNITED STATES PATENTS

| | | |
|---|---|---|
| 1,845,479 | Carpenter | Feb. 16, 1932 |
| 2,123,781 | Huber | July 12, 1938 |
| 2,414,355 | Bogoslowsky | Jan. 14, 1947 |
| 2,679,807 | Bruckmann | June 1, 1954 |